(12) United States Patent
Walters

(10) Patent No.: US 10,986,824 B1
(45) Date of Patent: Apr. 27, 2021

(54) ILLUMINATIVE FISHING POLE

(71) Applicant: Kevin L. Walters, Bonner Springs, KS (US)

(72) Inventor: Kevin L. Walters, Bonner Springs, KS (US)

(*) Notice: Subject to any disclaimer, the term of this patent is extended or adjusted under 35 U.S.C. 154(b) by 477 days.

(21) Appl. No.: 15/886,159

(22) Filed: Feb. 1, 2018

(51) Int. Cl.
*A01K 87/00* (2006.01)

(52) U.S. Cl.
CPC .................. *A01K 87/007* (2013.01)

(58) Field of Classification Search
CPC ....... A01K 87/007; A01K 87/04; A01K 87/00
See application file for complete search history.

(56) References Cited

U.S. PATENT DOCUMENTS

| | | | | |
|---|---|---|---|---|
| 2,616,202 A * | 11/1952 | Romberger | ........... | A01K 87/007 43/17 |
| 3,017,499 A * | 1/1962 | Fore | ...................... | A01K 87/007 43/17.5 |
| 4,117,618 A * | 10/1978 | Utsler | .................. | A01K 87/007 43/17.5 |
| 4,697,375 A * | 10/1987 | Mills | ....................... | A01K 87/04 43/17.5 |
| 4,775,920 A | 10/1988 | Seibert | | |
| 5,172,508 A * | 12/1992 | Schmidt | ............... | A01K 87/007 43/17.5 |
| 5,205,061 A * | 4/1993 | Echols, Jr. | ............ | A01K 97/125 43/17.5 |
| 5,276,990 A * | 1/1994 | Ramirez | .............. | A01K 97/125 43/17.5 |
| 5,347,741 A * | 9/1994 | Konrad | ................ | A01K 87/007 43/17.5 |
| 5,566,493 A * | 10/1996 | Minorics | .............. | A01K 87/007 43/17.5 |
| 5,738,433 A * | 4/1998 | Sparks | .................. | A01K 87/007 362/109 |
| 6,000,808 A * | 12/1999 | Hansen | .................. | F21V 33/008 362/109 |
| 6,122,853 A * | 9/2000 | Genous-Moore | .... | A01K 97/125 362/102 |

(Continued)

FOREIGN PATENT DOCUMENTS

| | | | | |
|---|---|---|---|---|
| FR | 2875102 A1 * | 3/2006 | ............. | A01K 85/01 |
| GB | 2170084 A * | 7/1986 | ........... | A01K 87/007 |

(Continued)

*Primary Examiner* — Kathleen I Alker
(74) *Attorney, Agent, or Firm* — Sanchelima & Associates, P.A.; Christian Sanchelima; Alexander Rodriguez

(57) ABSTRACT

The present invention discloses an illuminative fishing pole incorporated with a bulb or fiber optic wires to illuminate the fishing pole, which can be used for night fishing activities. The fishing pole extending from bottom handle to top tip or eyelet, comprises a portable power source, one or more light sources, at least one fiber optic cable or wire, and a power (on/off) button. The light is emitted from the light source powered by the power source, where the emitted light is passed onto the fiber optics along the length of the fishing pole to illuminate the fishing pole from its base or bottom handle to its tip or eyelet. The fishing pole according to the present invention, eliminates electrical vibration. The illuminative fishing pole kit can also be used to alter the existing fishing rod or retrofittable to the existing fishing poles already in use.

7 Claims, 3 Drawing Sheets

(56) References Cited

U.S. PATENT DOCUMENTS

| | | | | |
|---|---|---|---|---|
| 6,193,387 | B1* | 2/2001 | Schlichting | A01K 97/00 362/109 |
| 6,523,987 | B1* | 2/2003 | Lee | A01K 87/007 362/120 |
| 6,546,665 | B1* | 4/2003 | Eldredge | A01K 87/007 43/17.5 |
| 6,789,348 | B1 | 9/2004 | Kneller | |
| 7,824,054 | B2* | 11/2010 | Rigsbee, Jr. | A01K 97/00 362/109 |
| 8,104,220 | B2* | 1/2012 | Cobb | A01K 87/007 43/17 |
| 2005/0018418 | A1* | 1/2005 | Keith | A01K 87/007 362/109 |
| 2006/0288629 | A1* | 12/2006 | Parker | A01K 87/007 43/17.5 |
| 2007/0283612 | A1* | 12/2007 | Shaw | A01K 97/125 43/17 |
| 2008/0216383 | A1* | 9/2008 | Pierick | A01K 89/01121 43/18.1 R |
| 2012/0227307 | A1* | 9/2012 | Cuevas | A01K 87/007 43/17.5 |
| 2016/0007582 | A1* | 1/2016 | Brancaleoni | F21V 33/008 43/17.5 |

FOREIGN PATENT DOCUMENTS

| | | | | |
|---|---|---|---|---|
| GB | 2175781 | A * | 12/1986 | A01K 87/007 |
| GB | 2394156 | A * | 4/2004 | A01K 87/007 |
| GB | 2436274 | A * | 9/2007 | A01K 97/125 |

\* cited by examiner

ILLUMINATIVE FISHING POLE

BACKGROUND OF THE INVENTION

1. Field of the Invention

The present invention generally relates to a fishing pole. More specifically, the present invention relates to fishing pole for illuminating tip or each eyelet or any area by incorporating bulb or fiber optic wires from its base or bottom handle, which can be used for night fishing activities.

2. Description of the Related Art

Sport fishing industry has become extremely popular and millions of people around the world participate in recreational and competitive fishing activities. Dawn, dusk and night time are the most popular times for fishing and fishermen often find themselves either fishing or dealing with their fishing equipment in darkness or near darkness. Because fishing includes a long pole, hooks and other tackle that can cause injury, it is extremely important that the fisherman be aware of the location and position of the tackle during use.

In the past, night time lighting for fishing has been provided by artificial illumination such as flashlight, lanterns or other self-contained portable light sources. While this type of lighting has its uses for rummaging through tackle boxes and the like, it has not entirely been useful for some cases. It is a common practice for the fisherman to lay out the tackle box and other large equipment including extra poles and the like. In addition, the fisherman may prop-up one or more poles in a holder in order to have multiple lines in the water while enabling the fisherman to relax or do other activities. It is important though that even though the equipment is at a distance, that some sort of eye can be kept on the equipment, especially to identify if there is a fish on the line of a pole.

According, there are a number of devices that have been developed and marketed which help keep track of individual pieces of tackle by lighting it in a number of ways. Each has some advantages but each also has its own set of drawbacks. In U.S. Pat. No. 4,775,920 to Seibert et al, there is disclosed a fishing pole with an internal lighting system. The pole has a hollow transparent area which is lit by a battery operated light source. In U.S. Pat. No. 6,789,348 to Kneller et al, there is disclosed another hollow fishing pole with and LED light source. Kneller teaches how to light the tip of a fishing pole with use of a glowing tip end.

While the above devices have their utility in providing a way to light an individual fishing pole they require a specially adapted fishing pole with the pole portion being made of specific clear plastic materials. Generally, fishermen own a number of fishing poles and other fishing tackle and the like. These poles, unless lost, tend to last a lifetime. Further, fishing poles tend to have the pole section made of very specific materials such as carbon fiber, that aid in the fishing process especially when reeling in a caught fish. Fishing poles with internal lighting devices not only would require the replacement of all the fisherman's fishing poles which these days have become very expensive, it would require making them in such a way that they no longer provided the optimum fishing characteristics desired by fishermen.

While it is clear that lighted fishing poles and equipment are desirable as evidenced by the extremely crowded art of lighting fishing poles, it is clear that no one has yet introduced a lighting system or discovered or combined the elements of a lighting system which overcomes the limitations and meets the needs disclosed above with the known fishing pole lighting systems.

SUMMARY OF THE INVENTION

It is one of the main objectives of the present invention to provide an inexpensive and light-weight fishing pole for illuminating tip or first eye by bulb or fiber optic wires from its base or bottom handle, which can be used for night fishing activities.

It is another objective of the present invention to provide the illuminative fishing pole configured with light sources and fiber optic wires for avoiding attraction of bugs or any other insects.

It is another objective of the present invention to provide the illuminative fishing pole configured with light sources and fiber optic wires for eliminating electrical vibrations.

It is still another objective of the present invention to provide the illuminative fishing pole which can be employed for various existing fishing pole without the need of any major alterations.

It is yet still another objective of the present invention to provide the illuminative fishing pole which can be readily used in fresh and salt water, any water resource across the world, especially for the fishermen/users in interest on night fishing activities.

Further objects of the invention will be brought out in the following part of the specification, wherein detailed description is for the purpose of fully disclosing the invention without placing limitations thereon.

BRIEF DESCRIPTION OF DRAWINGS

The foregoing summary, as well as the following detailed description of the invention, is better understood when read in conjunction with the appended drawings. For the purpose of illustrating the invention, exemplary constructions of the invention are shown in the drawings. However, the invention is not limited to the specific methods and structures disclosed herein. The description of a method step or a structure referenced by a numeral in a drawing is applicable to the description of that method step or structure shown by that same numeral in any subsequent drawing herein.

DETAILED DESCRIPTION OF THE EMBODIMENTS OF THE INVENTION

Illustrative embodiments of the present invention are described below. The following explanation provides specific details for a thorough understanding of and enabling description for these embodiments. One skilled in the art will understand that the invention may be practiced without such details. In some instances, well-known structures, processes and functions have not been shown or described in detail to avoid unnecessarily obscuring the description of the embodiments.

It shall be noted that unless the context clearly requires otherwise, throughout the description, the words "comprise," "comprising," "include," "including," and the like are to be construed in an inclusive sense as opposed to an exclusive or exhaustive sense; that is to say, in the sense of "including, but not limited to." Words using the singular or plural number also include the plural or singular number, respectively while adhering to the concepts of the present invention. Furthermore, references to "one embodiment" and "an embodiment" are not intended to be interpreted as excluding the existence of additional embodiments that also incorporate the recited features.

Figure 1:
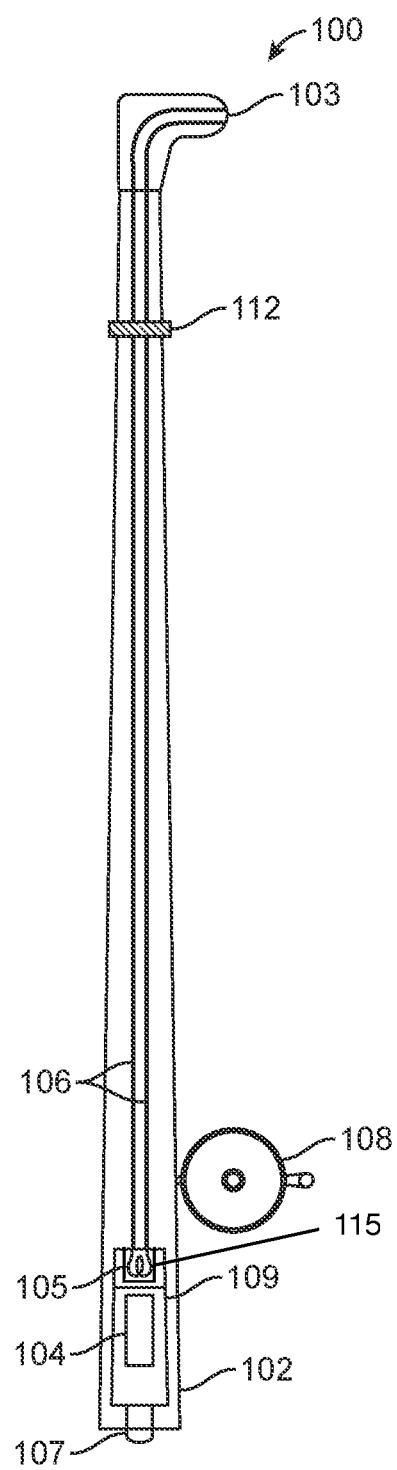
FIG. 1 shows a perspective view of an illuminative fishing pole, in an embodiment of the present invention.

Referring to FIG. 1, an illuminative fishing pole 100 configured with lighting components to illuminate the entire or particular portion of the fishing pole, which can be used for night fishing activities, is disclosed. In an embodiment, the fishing pole 100 extending from bottom handle 102 to top tip or eyelet 103, comprises a portable power source 104, one or more light sources 105, at least one fiber optic cable or wire 106, and a power (on/off) button 107. Although a spinning reel 108 is illustrated, it should be understood that a spin-casting reel can also be accommodated. In one embodiment, the fishing pole 100 further comprises a metal casing 109 to house one or more light sources 105 powered by one or more power source 104 with power or on/off button 107. The light is emitted from the light source 105 powered by the power source 104, where the emitted light is passed onto the fiber optic cable 106 along the length of the fishing pole 100 to illuminate the fishing pole 100 up to its eyelet or tip 103.

In some embodiments, the light source 105 can be a small bulb, a LED light or any bulb. Smaller light sources or green color light source can be used to avoid attracting bugs. As an advantage, LED light produces less electrical vibration than other bulbs. Further, any rubber or elastic material 115 could be used around lighting source 105 or fiber optic cable 106 to prevent electrical vibration along the length of the fishing pole 100. The power button or on/off switch 107 is located on the handle 102, which could illuminate the tip 103 of the fishing pole 100. The fishing pole 100 is made of graphite, fiberglass or any transparent material. Fiberglass fishing poles 100 is installed with the transparent or translucent fiber optic cable 106 outside along the side to illuminate the length of the fishing pole 100, before or during any alteration.

Figure 2:
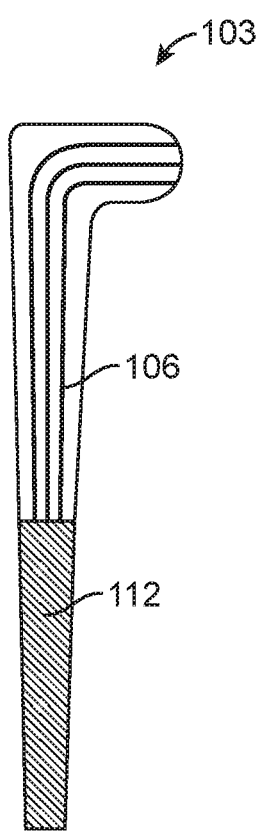
FIG. 2 shows a front view of the tip or eyelet of the illuminative fishing pole, in an embodiment of the present invention.

Referring to FIG. 2, the tip 103 of the fishing pole 100 is a transparent tip, or color tip. Tip 103 of the fishing pole 100 can be made of light-weight glass material, transparent or colored plastic material. The tip 103 of the fishing pole 100 can be illuminated by one or more light source 105. If the tip 103 of the fishing pole 100 is transparent, different colors can be illuminated by changing the color of the bulb. The tip 103 of the fishing pole 100 can be illuminated by one or more fiber optic cables.

Figure 3:
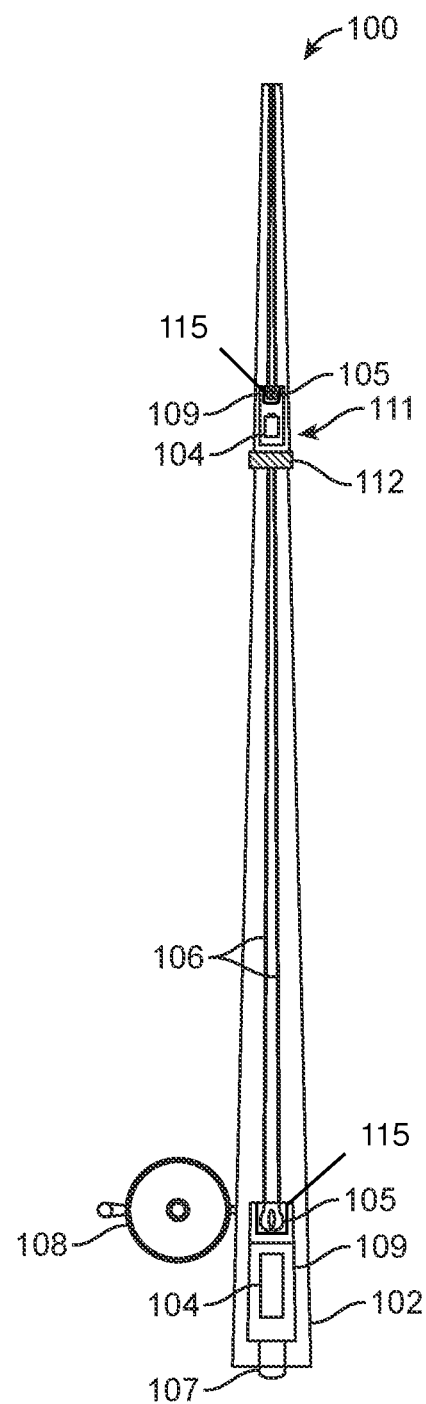
FIG. 3 shows a perspective view of an illuminative fishing pole, in another embodiment of the present invention.

Referring to FIG. 3, the fishing pole 100 further comprises a metal casing 109 to house one or more light sources 105 powered by one or more power source 104 with on/off button 107. The power source 104 is a battery or an in-built chargeable battery. Battery can be positioned in middle portion 111 or ends of the fishing pole, where it is enough to receive AAA type or AA type battery. The metal casing 109 with said lighting and power components is positioned or arranged inside the handle 102 of the fishing pole 100. The metal casing 109 with said lighting and power components is positioned or arranged inside the tip 103 or middle region 111 of the fishing pole 100. The fiber optic cable 106 could be fitted and illuminated in connection or contact to the light source 105. Further, the light source 105 can be used interchangeably, either from the middle portion 111 or handle 102 of the fishing pole.

The fiber optic cables 106 are installed outside along the length of the pole 100, which is configured to illuminate on receiving light from the light sources 105 at an end. Further, the fiber optic cable 106 is configured to illuminate at each eyelet, tip or from top eyelet to its tip 103. The fiber optic cable 106 can be translucent or transparent material in different length and sizes. The length and size of the fiber optic cable 106 can be based on the size and length of the fishing pole 100, where lighting property must be less dependent to the light source 105. Silicon foam 112 or any light-weight, soft and flexible foam sleeves is used for arresting the movement or withholding the fiber optic cable 106 on the fishing pole 100. Fiber optic cable 106 could also be implemented on a limb line fishing or catfish fishing pole, if line can come out of the top to hook loosely to line and retractable, so it does not interfere with the fish in line.

The illuminative fishing kit can also be used to alter the existing fishing pole or retrofittable to the existing fishing poles already in use. The illuminative fishing pole 100 according to the present invention, eliminates electrical vibration. Usage of fiber optic cable 106 produces light, and avoid vibration. The illuminative fishing pole 100 can be used in fresh and salt water, any water resource across the world, especially for the users in interest on night fishing activities.

Preferred embodiments of this invention are described herein, including the best mode known to the inventors for carrying out the invention. It should be understood that the illustrated embodiments are exemplary only, and should not be taken as limiting the scope of the invention.

The foregoing descriptions comprise illustrative embodiments of the present invention. Having thus described exemplary embodiments of the present invention, it should be noted by those skilled in the art that the within disclosures are exemplary only, and that various other alternatives, adaptations, and modifications may be made within the scope of the present invention. Merely listing or numbering the steps of a method in a certain order does not constitute any limitation on the order of the steps of that method. Many modifications and other embodiments of the invention will come to mind to one skilled in the art to which this invention pertains having the benefit of the teachings presented in the foregoing descriptions. Although specific terms may be employed herein, they are used only in generic and descriptive sense and not for purposes of limitation. Accordingly, the present invention is not limited to the specific embodiments illustrated herein.

What is claimed is:
1. A fishing pole, comprising:
 a) a pole having a bottom handle and a middle portion, wherein said bottom handle and said middle portion each includes a metal casing housing at least one light source and at least one power source therein, wherein said at least one light source is a light emitting diode emitting a green light adapted to avoid attracting bugs, wherein said at least one light source is surrounded by a rubber or elastic material adapted to prevent electrical vibration along a length of said pole, wherein said pole is made of a transparent material, said bottom handle including a power on and off button located at a bottommost end of said bottom handle configured to actuate said at least one power source, wherein said at least one power source is a portable power source, a spinning reel engaged to a side of said pole;

b) a top tip located at a topmost end of said pole, wherein said top tip is a right-angle tip which is made of a transparent material; and c) a transparent fiber optic cable mounted along said length of said pole, wherein said transparent fiber optic material extends from the metal casing of said middle portion to said top tip, wherein said transparent fiber optic cable is in contact with said at least one light source of the middle portion, wherein said top tip and said transparent fiber optic cable are each illuminated when said at least one power source of said middle portion is actuated, wherein said pole further includes a flexible foam sleeve to couple said transparent fiber optic cable to said pole, said flexible foam sleeve located between said top tip and said handle.

2. The fishing pole of claim 1 wherein said top tip is an eyelet.

3. The fishing pole of claim 1 wherein said pole tapers inwardly from said bottom handle to said top tip.

4. The fishing pole of claim 1 wherein said spinning reel is located between said bottom handle and said top tip.

5. The fishing pole of claim 1 wherein said at least one power source of the metal casing located on the middle portion is an AA battery.

6. The fishing pole of claim 1 wherein said at least one power source of the metal casing located on the bottom handle is an AA battery.

7. The fishing pole of claim 1 wherein the power on and off button protrudes outwardly from an interior of the bottom handle.

\* \* \* \* \*